Oct. 27, 1970   K. J. CLEEREMAN ET AL   3,536,500

PACKAGED FOOD

Filed Sept. 23, 1966

INVENTORS.
Kenneth J. Cleereman
Turner Alfrey, Jr.
BY Dominik, Stein & Knechtel
ATTORNEYS

United States Patent Office 3,536,500
Patented Oct. 27, 1970

3,536,500
PACKAGED FOOD
Kenneth J. Cleereman and Turner Alfrey, Jr., Midland, Mich., assignors to The Dow Chemical Company, Midland, Mich., a corporation of Delaware
Filed Sept. 23, 1966, Ser. No. 581,570
Int. Cl. B65d 23/00, 81/00
U.S. Cl. 99—171                       2 Claims

ABSTRACT OF THE DISCLOSURE

Packaged food containing butterfat, the container being blow molded out of an injection molded parison of polystyrene wherein one of the mold elements was rotated to orient the molecules.

---

Figure 1:
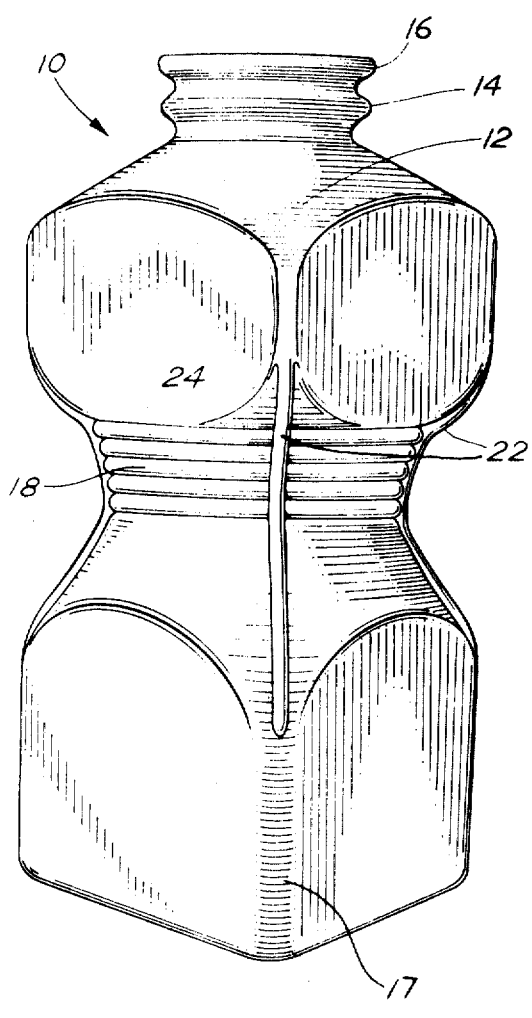

This invention relates to a novel packaged food and more particularly, it relates to a plastic packaged food product which contains butterfat.

It is generally well known that articles formed of plastic are subject to stress cracking and crazing. "Stress cracking" may be defined as the development of fine cracks on or under the surface of a plastic article. These cracks may range from those of relatively large size, individually visible to the unaided eye, down to those of almost microscopic size visible only en masse as "water bloom." Stress cracking very often starts with the development of a few small isolated cracks, which progress into larger patterns containing hundreds of small cracks. If a sufficient number of these patterns join, mechanical failure may result.

"Crazing" is associated with the lowering of stress crack resistance by the chemical action of various reagents. This phenomenon has been generally explained, by the prior art, as a plasticizer action which reduces the attractive forces between polymer chains so that they may pull apart at the lower strain.

One reagent which is particularly destructive to plastic, is butterfat or any food product having butterfat therein. Depending upon butterfat content, the useful life of the plastic may be relatively short due to a rapid lowering of the stress crack resistance.

General purpose polystyrene falls into the category of "plastic" which is adversely affected by butterfat. Even though it can be fabricated inexpensively into a clear, transparent attractive package, it is extremely susceptible to stress cracking and crazing and, when used with dairy products which contain butterfat, it is virtually useless.

It is an object of this invention to provide a plastic container which is useful for dairy or other like products which contain butterfat.

It is another obejct to provide a plastic bottle for milk, not subject to mechanical failure due to stress cracking and crazing.

It is still another object to provide a plastic bottle that will not bulge when filled, is easy to handle and will not collapse on rapid emptying.

It is still another object to provide a plastic packaged food product which contains butterfat.

Other objects of the invention will in part be obvious and will in part appear hereinafter.

It has now been found that oriented plastic, particularly polystyrene, can be used to package dairy products which contain butterfat, without being subject to mechanical failure due to stress cracking and crazing. In particular, a milk bottle has been fabricated of oriented polystyrene, and it has been found that it is entirely satisfactory. The milk bottle also has a unique configuration which imparts wall strength to prevent it from bulging when filled and from collapsing on rapid emptying. The bottle also has a configuration which permits it to be easily handled by the milk processor as well as the ultimate consumer.

The invention accordingly comprises an article of manufacture possessing the features, properties, and the relation of elements which will be exemplified in the article hereinafter described, and the scope of the invention will be indicated in the claims.

Figure 2:
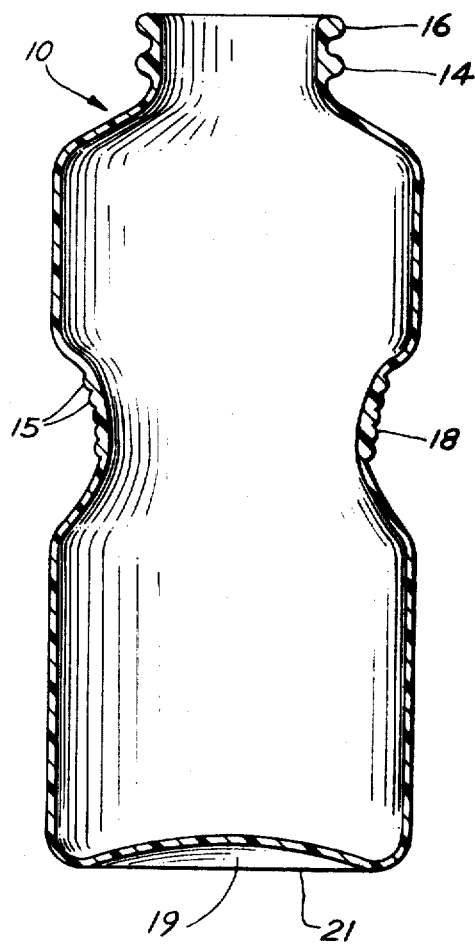

For a fuller understanding of the nature and objects of the invention, reference should be had to the following detailed description taken in connection with the accompanying drawing, in which:

FIG. 1 is a perspective view of a milk bottle fabricated in accordance with the invention; and FIG. 2 is a section view taken along lines 1—1 of FIG. 1.

Referring now to the drawing, the milk bottle 10, exemplary of the invention, has a generally rectangular shape with a gradually tapering top portion 12 which terminates into a cylindrical neck portion 14. An annular rim 16 is formed about the neck portion 14, which serves a dual function, namely, of providing support during filling and capping and of providing a grip support for carrying it. The corners 17 of the bottle 10 are rounded both to add to the attractiveness of the bottle and for rigidity. An identation 19 in the bottom 21 of the bottle adds rigidity to the bottom to prevent it from bulging.

A recessed circular waist 18 which is preferably of substantial depth is formed substantially centrally about the bottle 10. The waist 18 adds rigidity to the sides of the bottle to prevent them from bulging when filled and from collapsing when gripped. A number of corrugations 15 formed in the waist 18 provide still additional rigidity to the bottle, to prevent it from bulging or collapsing. Vertical ridges 22 are provided in at least each of the corners 17 and are extended across the corrugations. Ridges 22 prevent the waist 18 from collapsing in an accordion-like fashion. The corners 17 of the bottle are further tapered, as at 24, to flow and join with the waist 18.

The shape of the bottle 10 about the waist area is also designed to advantageously benefit from the strength of the oriented molecules of the plastic utilized. In addition, the tapering provides both rigidity to the side wall so that there will be little, if any, outward bowing, when the bottle is filled, or collapsing when the bottle is grasped by the consumer. The tapers also add an attractive appearance to the overall bottle design. The entire dimension of the milk bottle including the height of the opening of the neck portion 14 is designed to correspond to those which are generally standard throughout the industry. Thus, milk processors, may continue to use their existing bottling machinery.

The waist 18 also provides a hand grip whereby the milk bottle can be easily grasped by the consumer. This feature is particularly important since certain plastic has a tendency to be slippery, specially when moist.

Now as to the plastic employed, it is one which has multi-directionally oriented molecules therein. It may comprise polystyrene, polyethylene, polypropylene, ethyl cellulose, acrylonitrile-butadiene-styrene, the polyacetals, the polyacrylics, cellulose acetate, cellulose propionate, cellulose acetate butyrate, chlorinated polyether, polychlorotrifluoroethylene, polytetrafluoroethylene, nylon, ethylene-ethyl acrylate copolymer, ethylene-vinyl acetate copolymer, styrene acrylonitrile copolymer, polycarbonate, vinylidene chloride, vinyl formal, polyvinyl dichloride, and polyvinylidene fluoride.

For example, milk bottles fabricated of general purpose polystyrene, via a blow molding technique, using a parison, with molecules oriented in a multi-directional manner are found to be entirely satisfactory for extended use. By "extended use" is meant over several months or more dependent upon handling abuse. The following table represents the "extended use" that is possible.

TABLE I.—EFFECT OF MILK AS A CRAZE AGENT ON POLYSTYRENE CONTAINERS

Wall thickness of container: .035″
Material of container: Styron 678 K 27 (Dow Chemical Company, Midland, Michigan)
Pressurized testing medium: Grade A—homogenized milk
Hoop fiber stress applied: 3000 p.s.i.
Temperature during test: 72° F.

| Sample | Level of orientation | No. of revolutions injection mold rotated after fill | Time to break, minutes |
|---|---|---|---|
| 1 | 0 | 0 | 22 |
| 2 | Almost 0 | .17 | 3 |
| 3 | Low | .51 | 2,231 |
| 4 | Moderate | 1.20 | 11,284 |
| 5 | Optimum | 1.88 | 11,284 |

The forming of these oriented parisons was accomplished by substantially following the techniques disclosed in U.S. patent application 318,745, filed Oct. 10, 1963 in the name of Kenneth J. Cleereman, one of the coinventors of the present invention.

Typically, dairy products which can be packaged in the above described container include milk (raw, pasteurized, homogenized and the like), commercial grade milk, Guernsey milk, cream including half and half, whipping cream, sour cream and buttermilk and any synthetic or formulated butterfat product.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A package comprising a substantially rigid container with a food product containing butterfat therein, said container being formed of plastic having multi-directionally oriented molecules and having a substantially rectangular-shaped body portion having a bottom and rounded corners which, at the top of said package, taper inwardly and join to form a cylindrical-shaped neck portion, an annular rim about the upper end of said neck portion and a recessed waist portion substantially centrally positioned and extending about said body portion, a plurality of corrugations formed about said body portion in said waist portion to provide rigidity to said package to prevent it from bulging.

2. The package of claim 1 further including a vertical ridge in at least the corners of said body portion which extend across said waist portion including said corrugations, for preventing said waist portion from collapsing in an accordion-like fashion.

References Cited

UNITED STATES PATENTS

| | | |
|---|---|---|
| D. 136,997 | 1/1944 | Clark. |
| D. 193,637 | 9/1962 | Ferraro. |
| 2,372,177 | 3/1945 | Conner. |
| 3,029,963 | 4/1962 | Evers. |
| 3,168,207 | 2/1965 | Noland et al. |
| 3,185,353 | 5/1965 | Mercier. |
| 3,288,317 | 11/1966 | Wiley. |
| 3,290,198 | 12/1966 | Lux et al. |
| 3,312,262 | 4/1967 | Hunter. |

FOREIGN PATENTS

| | | |
|---|---|---|
| 1,416,663 | 9/1965 | France. |

DONALD F. NORTON, Primary Examiner

U.S. Cl. X.R.

215—1